Figure 1:
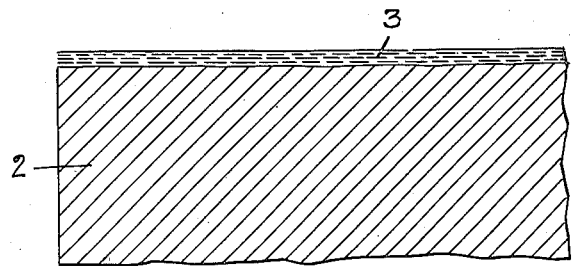

Dec. 9, 1924.                                              1,518,398
J. B. EDIE
SURFACING CONCRETE BLOCKS, TILES, AND THE LIKE
Filed Oct. 12, 1922

INVENTOR
John B. Edie,
By Kay, Totten & Brown,
Attorneys

Patented Dec. 9, 1924.

1,518,398

UNITED STATES PATENT OFFICE.

JOHN B. EDIE, OF PITTSBURGH, PENNSYLVANIA, ASSIGNOR OF ONE-HALF TO J. H. TOUPET, OF PITTSBURGH, PENNSYLVANIA.

SURFACING CONCRETE BLOCKS, TILES, AND THE LIKE.

Application filed October 12, 1922. Serial No. 594,101.

*To all whom it may concern:*

Be it known that I, JOHN B. EDIE, a citizen of the United States, and resident of Pittsburgh, in the county of Allegheny and State of Pennsylvania, have invented a new and useful Improvement in Surfacing Concrete Blocks, Tiles, and the like; and I do hereby declare the following to be a full, clear, and exact description thereof.

My invention relates to the surfacing of concrete blocks, tiles, bricks and the like, and its object is to provide an improved method of producing protective coatings upon such materials which shall be attractive in appearance and durable when exposed to the weather.

Concrete building blocks and other artificial stones have heretofore been coated or veneered in various ways for the purpose of imitating the appearance of natural stones. The usual method of applying such surface coatings has been to mold the surface veneer upon the body of the artificial block, the surface material being ground granite, ground sandstone or other similar granular material. In other cases, the veneer is previously molded, cast, or otherwise formed, and is then secured to the body of the block while the block is being molded.

According to my present invention I coat artificial stones, tiles, bricks and the like after they have been completed in the usual manner, and even after they have been laid up in walls or partitions. My improved method consists, in a general way, in covering the surface of the block or wall with a thin but substantial layer of an initially plastic adhesive material in the nature of a plaster or cement which will harden or set, and, while the adhesive material is still unset, projecting granular material into the adhesive layer, preferably by means of an air blast, the quantity of the granular material and the force of the blast being sufficient to cause the granular material to penetrate to the full depth of the adhesive coating and saturate it thoroughly. In addition, a dense layer of the granular material is caused to adhere to the surface of the adhesive coating.

The final coating produced by my process consists of a dense and substantially continuous coating of granular material held together and secured to the body of the block or wall by means of adhesive material, the quantity of granular material being so large, as compared with the amount of adhesive material, that the latter may be said to be supersaturated with the granular substance.

It is evident that, by this method of inblowing the granular material by strong blast pressure into the adhesive material while the adhesive in plastic, more than an adhering relation is established between the granular material and the adhesive material. The granular material becomes thoroughly incorporated with the adhesive material, and the structure of the final coating is practically homogeneous throughout. This is a most important feature of my method, because it prevents the granular material from being removed by the weather or by brushing, and also because the coatings produced by my method rely for their protective power mainly upon the granular material and not upon the adhesive material, which has the principal function of causing the granular material to adhere to the surface that is coated. The advantages of my method over the processes heretofore used for facing building blocks reside largely in this feature of incorporating the granular coating material thoroughly with the adhesive, as distinguished from merely applying granular material superficially upon an adhesive-coated surface.

Figure 2:
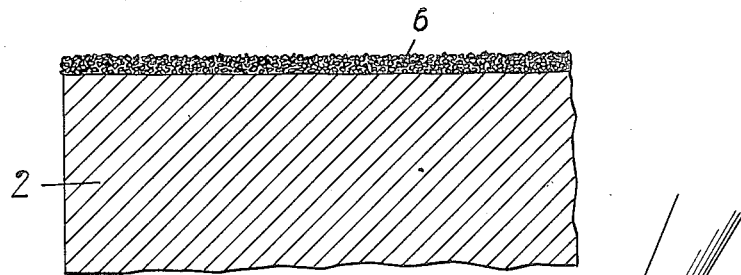

In the accompanying drawing, Fig. 1 is an enlarged sectional view through a portion of a block coated with adhesive material; Fig. 2 is a similar view showing the appearance of the coating after granular material has been applied according to my invention; and Fig. 3 is a fragmentary perspective view illustrating the application of the granular material by means of an air blast.

In the accompanying drawing the numeral 2 indicates the body portion of the article to be coated, which may be a concrete block, a tile, a brick, or a portion of a wall composed of concrete, tiles, building blocks or the like. Fig. 1 shows the article 2 covered with a layer 3 of adhesive material which is initially plastic and is capable of setting. The adhesive layer 3 is preferably as thin as is practicable. If the adhesive material is applied by hand it may be in the neighborhood of ⅛ of an inch thick, but if the adhesive coating is applied by mechanical means, such as a cement gun, it can be made much thinner, and excellent results have been obtained with coatings applied in this manner, where the adhesive layer is not more than 1/16 of an inch thick.

Figure 3:
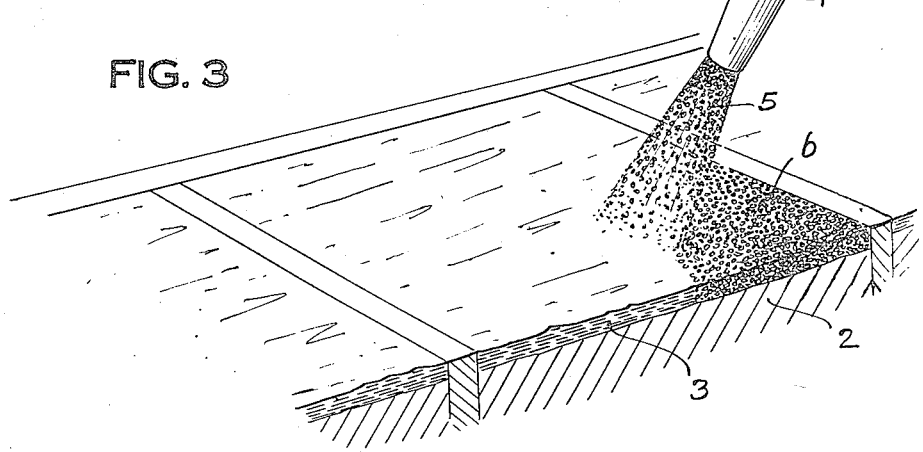

After the adhesive layer 3 is applied, granular material is projected forcibly into the adhesive layer, this operation being shown diagrammatically in Fig. 3, where a nozzle 4 is shown delivering a blast carrying finely divided granular material 5. The blast should be strong enough to cause the granular material to penetrate the adhesive layer 3 and saturate it thoroughly, but the blast should not be strong enough to bodily displace the adhesive material 3 since this results in a smeared and uneven surface.

The final coating produced in the manner just described is indicated at 6 in Fig. 2, and consists largely of finely divided granular material held together and secured upon the surface of the block by means of the adhesive material first applied.

While my invention is not limited to the use of granular material of any particular fineness, the particles composing the granular coating material may suitably be of such size as to pass through a sieve having 10 to 20 meshes per inch. Such material is much finer than the crushed rock aggregates which have heretofore been used for facing blocks and for similar purposes. Granular material of this fineness cannot be used in ordinary methods of facing molded blocks, because if such facing material is placed in a mold and the mold is then filled with plastic concrete or other molding material the fine granular material will mingle with the plastic block material and will entirely disappear.

My present process makes it possible to apply to the surface of building blocks, tiles and the like a much greater quantity of granular coating material than is possible by the methods which have heretofore been employed. The coatings produced by my process may be made to contain at least as much granular material as adhesive material, while coatings made by ordinary methods in the nature of stucco contain 6 to 8 times as much adhesive as granular material.

The surface appearance of the finished coatings may be readily controlled by proper manipulation of the blast nozzle. Thus, if the nozzle is moved too hurriedly over the surface to be coated, and the granular coating has been applied too lightly, it may readily be thickened by again going over the same surface with the blast nozzle. This is sometimes necessary on large continuous surfaces, such as concrete walls.

While it is usually desirable to cover the surface of the adhesive material completely with the granular material so that the adhesive material substantially disappears, it is sometimes desirable, for producing particular ornamental effects, to permit some of the adhesive to show through the granular coating. This may also be readily controlled by manipulating the nozzle which projects the granular material upon the adhesive.

Numerous materials may be employed in carrying out my method. The adhesive coating may suitably consist of a cement of the magnesium oxychloride type, which has the advantage that it remains white after hardening and remains plastic for a considerable period before it becomes fully set. Other adhesive materials may, however, be readily employed, such materials being made from Portland cement, plaster or other substances, the only requirement being that the adhesive shall be capable of being applied in a semi-liquid or plastic condition to the surfaces to be coated, and shall harden after the granular material is applied so as to secure the granular material in place.

For the granular coating material, ground glass, seasand, ground granite, ground marble and ground sandstone may be mentioned as examples. It will be evident that many other finely divided materials, and mixtures of materials, are suitable for use in surfacing blocks, tiles and the like, according to my method. Coloring matter may be employed to produce special effects, and such coloring matter may be applied either to the adhesive or to the granular coating material, or to both the adhesive and the granular material.

Ground glass is very desirable as the granular material in producing the coatings described above, since it gives a glistening and attractive appearance to the coated surface. The glass may be used alone or mixed with sand, ground rock or other suitable materials. For example, bath room walls and other interior surfaces may be given a pure white and very attractive coating by using ground glass alone as the granular material, and by employing a white cement as the adhesive material.

I am aware that it has been proposed to coat building blocks by covering their surfaces with an adhesive and then sifting granular material thereon, and also that walls are commonly provided with stucco coatings produced by covering the wall with metal or wooden lath, spreading mortar upon the lath, and then dashing pebbles or similar material upon the mortar. Such coatings differ from the coatings produced by my invention in that the granular material merely sticks to the surface of the adhesive and does not penetrate it. In stucco coatings the mortar layer is necessarily very thick, and carries a comparatively small amount of coarse solid material which covers the mortar only partially and superficially, and never saturates and completely covers the mortar. The coatings produced according to my method, as stated above, consist mainly of finely divided granular material secured directly to the face of the block or wall by means of an amount of adhesive material which is only sufficient to secure the granular material in place. The granular material saturates the interior of the adhesive layer, as distinguished from merely adhering to its surface.

I claim as my invention:

1. The method of facing tiles, brick, concrete and other building surfaces which comprises applying to the surface to be covered a layer of initially adhesive material that is capable of hardening, and projecting granular material into said adhesive layer with sufficient force and in sufficient quantity to substantially saturate said adhesive layer.

2. The method of facing tiles, bricks, concrete and other building surfaces which comprises applying to the surface to be covered a layer of an initially adhesive cement material that is capable of hardening and projecting granular material into said cement layer with sufficient force and in sufficient quantity to substantially saturate and completely cover said cement layer.

3. A building element having a facing or veneer composed of a layer of oxychloride cement substantially saturated and completely covered with finely divided granular material.

4. A concrete building block having a facing composed of a layer of initially adhesive material substantially saturated and completely covered with granular material.

5. A building element having a facing composed of a layer of initially adhesive material carrying a body of granular material comprising ground glass mixed with granular rock material.

6. A building element having a facing composed of a layer of initially adhesive material carrying a body of granular material comprising ground glass mixed with ground stone.

In testimony whereof I, the said JOHN B. EDIE, have hereunto set my hand.

JOHN B. EDIE.